United States Patent
Walker et al.

(10) Patent No.: US 11,046,420 B2
(45) Date of Patent: Jun. 29, 2021

(54) TRAILING EDGE FLAP HAVING A WAFFLE GRID INTERIOR STRUCTURE

(71) Applicant: The Boeing Company, Chicago, IL (US)

(72) Inventors: Steven P. Walker, Arlington, WA (US); Perlas G. Martinez, Everett, WA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 16/661,100

(22) Filed: Oct. 23, 2019

(65) Prior Publication Data
US 2021/0122135 A1 Apr. 29, 2021

(51) Int. Cl.
*B64C 9/00* (2006.01)
*B32B 1/04* (2006.01)
(Continued)

(52) U.S. Cl.
CPC ............... *B64C 9/00* (2013.01); *B29C 70/30* (2013.01); *B32B 1/08* (2013.01); *B32B 3/04* (2013.01); *B32B 3/266* (2013.01); *B32B 37/18* (2013.01); *B32B 38/0004* (2013.01); *B64C 9/02* (2013.01); *B64F 5/10* (2017.01); *B29C 70/06* (2013.01); *B29L 2024/00* (2013.01); *B29L 2031/3085* (2013.01); *B32B 1/04* (2013.01); *B32B 5/02* (2013.01); *B32B 2260/021* (2013.01);
(Continued)

(58) Field of Classification Search
None
See application file for complete search history.

(56) References Cited

U.S. PATENT DOCUMENTS 2,410,609 A * 11/1946 Pecker ................. B64C 27/473
244/123.9
2,674,327 A * 4/1954 Pullin ................... B64C 27/473
416/226
(Continued)

FOREIGN PATENT DOCUMENTS

CN 101865091 A * 10/2010
CN 102416700 A * 4/2012
(Continued)

OTHER PUBLICATIONS

European Search Report dated Mar. 5, 2021 from co-pending European Patent Application No. 20196065.5.

*Primary Examiner* — Jeffrey A Vonch
(74) *Attorney, Agent, or Firm* — Joseph M. Rolnicki; Evans & Dixon, L.L.C.

(57) ABSTRACT

An aircraft flap is constructed of nested layers of composite material in the aircraft flap that include an inner layer, a middle layer and an outer layer. The aircraft flap is constructed with the inner layer laid up around a central mandrel, the middle layer laid up around the middle layer and the outer layer laid up around the middle layer. The inner layer, the middle layer and the outer layer are co-cured on the mandrel, removed from the mandrel and then assembled together with the inner layer formed in a folded over configuration around a hollow interior volume of the aircraft flap, the middle layer formed in a folded over configuration over the inner layer, and the outer layer formed in a folded over configuration around the middle layer.

20 Claims, 7 Drawing Sheets

(51) Int. Cl.
  *B32B 1/08* (2006.01)
  *B32B 3/04* (2006.01)
  *B32B 3/24* (2006.01)
  *B64C 9/02* (2006.01)
  *B64F 5/10* (2017.01)
  *B32B 37/18* (2006.01)
  *B32B 38/00* (2006.01)
  *B32B 3/26* (2006.01)
  *B29C 70/30* (2006.01)
  *B32B 5/02* (2006.01)
  *B29C 70/06* (2006.01)
  *B64C 3/20* (2006.01)
  *B64C 9/16* (2006.01)
  *B64C 3/26* (2006.01)
  *B64C 3/18* (2006.01)
  *B29L 24/00* (2006.01)
  *B29L 31/30* (2006.01)

(52) U.S. Cl.
  CPC ..... *B32B 2260/046* (2013.01); *B32B 2605/18* (2013.01); *B64C 3/185* (2013.01); *B64C 3/20* (2013.01); *B64C 3/26* (2013.01); *B64C 9/16* (2013.01); *B64C 2009/005* (2013.01); *Y02T 50/40* (2013.01); *Y10T 428/13* (2015.01); *Y10T 428/1369* (2015.01); *Y10T 428/1393* (2015.01); *Y10T 428/2419* (2015.01); *Y10T 428/24331* (2015.01)

(56) References Cited

U.S. PATENT DOCUMENTS

| | | | | |
|---|---|---|---|---|
| 2,884,078 A * | 4/1959 | Stamm | B64C 27/473 | 416/226 |
| 3,002,567 A * | 10/1961 | Stulen | B64C 27/473 | 416/226 |
| 3,028,292 A * | 4/1962 | Hinds | B29D 24/008 | 156/214 |
| 3,135,486 A * | 6/1964 | Wing | B64C 3/26 | 244/123.8 |
| 3,552,881 A * | 1/1971 | Leigh | B64C 27/473 | 416/145 |
| 3,713,751 A * | 1/1973 | Fradenburgh | B64C 27/46 | 416/87 |
| 3,782,856 A * | 1/1974 | Salkind | B64C 27/473 | 416/226 |
| 3,967,996 A * | 7/1976 | Kamov | B23P 15/04 | 156/156 |
| 3,987,983 A * | 10/1976 | Cole | B64C 9/20 | 244/216 |
| 4,051,289 A * | 9/1977 | Adamson | B29C 70/08 | 428/113 |
| 4,081,220 A * | 3/1978 | Andrews | F03D 1/0675 | 416/226 |
| 4,177,306 A * | 12/1979 | Schulz | B29C 70/085 | 428/107 |
| 4,264,278 A * | 4/1981 | Weingart | B29C 70/386 | 416/226 |
| 4,275,994 A * | 6/1981 | Underhill, Jr. | B64C 27/473 | 416/226 |
| 4,657,615 A * | 4/1987 | Braun | B64C 3/28 | 156/245 |
| 5,087,187 A * | 2/1992 | Simkulak | B29C 43/32 | 264/258 |
| 5,216,799 A * | 6/1993 | Charnock | B64C 3/18 | 244/133 |
| 5,240,376 A * | 8/1993 | Velicki | F04D 29/023 | 416/229 A |
| 5,248,242 A * | 9/1993 | Lallo | B29C 70/342 | 156/156 |
| 5,346,367 A * | 9/1994 | Doolin | B29D 99/0025 | 156/213 |
| 5,383,566 A * | 1/1995 | Johnson | B29C 53/824 | 220/562 |
| 5,439,353 A * | 8/1995 | Cook | B29D 99/0028 | 416/230 |
| 5,547,629 A * | 8/1996 | Diesen | B29C 33/505 | 264/257 |
| 5,621,967 A * | 4/1997 | Frengley | B64C 27/46 | 29/889.6 |
| 5,885,059 A * | 3/1999 | Kovalsky | B64C 27/463 | 416/224 |
| 5,941,446 A * | 8/1999 | Yasui | B23K 31/02 | 228/157 |
| 6,007,894 A | 12/1999 | Barnes et al. | | |
| 6,190,484 B1 * | 2/2001 | Appa | B29C 70/32 | 156/189 |
| 6,237,873 B1 * | 5/2001 | Amaoka | B64C 3/00 | 244/123.7 |
| 6,375,127 B1 * | 4/2002 | Appa | B64C 3/48 | 244/203 |
| 6,513,757 B1 * | 2/2003 | Amaoka | B64F 5/10 | 244/123.7 |
| 6,638,466 B1 * | 10/2003 | Abbott | B29C 33/68 | 264/238 |
| 6,655,633 B1 * | 12/2003 | Chapman, Jr. | B29C 53/821 | 244/123.9 |
| 7,097,731 B2 | 8/2006 | Puriefoy et al. | | |
| 7,197,852 B2 | 4/2007 | Grillos | | |
| 7,753,313 B1 * | 7/2010 | Barr | B64C 9/24 | 244/123.1 |
| 8,642,151 B2 | 2/2014 | Goering et al. | | |
| 8,851,422 B2 | 10/2014 | Dan-Jumbo | | |
| 8,973,871 B2 | 3/2015 | Marcoe et al. | | |
| 9,302,446 B2 | 4/2016 | Fink | | |
| 2002/0011540 A1 * | 1/2002 | De Castro Nodal | B64C 3/20 | 244/45 R |
| 2002/0195524 A1 * | 12/2002 | Amaoka | B64C 3/00 | 244/123.2 |
| 2003/0102410 A1 * | 6/2003 | Gessler | B64C 3/50 | 244/215 |
| 2003/0116262 A1 * | 6/2003 | Stiesdal | B29D 99/0028 | 156/245 |
| 2003/0192990 A1 * | 10/2003 | Simpson | B29C 37/0064 | 244/123.7 |
| 2004/0000613 A1 * | 1/2004 | Thomas, Jr. | B64C 3/28 | 244/10 |
| 2004/0145080 A1 * | 7/2004 | Tanaka | B64C 9/00 | 264/257 |
| 2004/0253114 A1 * | 12/2004 | Gunneskov | F03D 1/0675 | 416/224 |
| 2008/0245927 A1 * | 10/2008 | Kulesha | B64C 3/187 | 244/123.1 |
| 2008/0245928 A1 * | 10/2008 | Kulesha | B64C 3/18 | 244/123.1 |
| 2009/0038744 A1 | 2/2009 | Lee | | |
| 2009/0072088 A1 * | 3/2009 | Ashton | B64C 3/187 | 244/124 |
| 2009/0148647 A1 | 6/2009 | Jones | | |
| 2009/0283635 A1 | 11/2009 | Gerken | | |
| 2010/0092300 A1 * | 4/2010 | Jensen | F03D 1/0675 | 416/233 |
| 2010/0181427 A1 * | 7/2010 | Makela | B64C 3/187 | 244/123.12 |
| 2010/0193636 A1 * | 8/2010 | De Vita | B29C 66/112 | 244/123.1 |
| 2010/0266416 A1 * | 10/2010 | Marshall | B64C 27/473 | 416/226 |
| 2011/0045276 A1 * | 2/2011 | Grove-Nielsen | B32B 17/04 | 428/300.7 |
| 2011/0142670 A1 * | 6/2011 | Pilpel | F01D 5/282 | 416/230 |
| 2012/0061515 A1 * | 3/2012 | Remene | B29D 24/004 | 244/123.1 |
| 2014/0284431 A1 * | 9/2014 | Grankaell | B29D 99/0028 | 244/90 R |
| 2015/0064013 A1 * | 3/2015 | Measom | B64C 11/26 | 416/226 |

(56) References Cited

U.S. PATENT DOCUMENTS

| | | | |
|---|---|---|---|
| 2015/0118436 A1* | 4/2015 | Fink | B32B 5/18 428/71 |
| 2015/0259061 A1* | 9/2015 | Brakes | B64C 3/50 244/214 |
| 2015/0329197 A1* | 11/2015 | Seack | B64C 3/185 244/123.7 |
| 2015/0343702 A1* | 12/2015 | Garcia Martin et al. B29C 65/4805 244/123.1 | |
| 2016/0046361 A1* | 2/2016 | Dan-Jumbo | B64C 3/182 244/87 |
| 2016/0114538 A1* | 4/2016 | Iagulli | B29D 99/0014 264/510 |
| 2016/0137287 A1* | 5/2016 | Reusch | B64C 3/20 244/87 |
| 2017/0106970 A1* | 4/2017 | Stawski | B32B 5/26 |
| 2017/0233061 A1* | 8/2017 | Seis | B64C 9/323 244/213 |
| 2017/0291687 A1* | 10/2017 | Everaert | B64F 5/10 |
| 2017/0334541 A1* | 11/2017 | Williams | B64C 3/185 |
| 2018/0043639 A1* | 2/2018 | Autry | B29C 70/446 |
| 2018/0086429 A1* | 3/2018 | Sheppard | B64C 9/00 |
| 2018/0117841 A1* | 5/2018 | Tyler | B29C 64/336 |
| 2018/0127083 A1* | 5/2018 | Filsegger | B29C 70/443 |
| 2018/0141636 A1* | 5/2018 | Currie | B64C 9/02 |
| 2018/0222571 A1* | 8/2018 | Santini | B64C 3/28 |
| 2018/0281923 A1* | 10/2018 | Walker | B64C 1/12 |
| 2018/0362143 A1* | 12/2018 | Bhatia | B64C 3/187 |
| 2019/0300147 A1* | 10/2019 | Kordel | B64C 9/16 |
| 2019/0300148 A1* | 10/2019 | Kordel | B64C 3/26 |
| 2020/0148327 A1* | 5/2020 | Elson | B29C 53/382 |
| 2020/0149419 A1* | 5/2020 | Peeters | B32B 15/20 |
| 2021/0070419 A1* | 3/2021 | Decker | B64C 3/14 |

FOREIGN PATENT DOCUMENTS

| | | | | |
|---|---|---|---|---|
| CN | 102514709 A | * | 6/2012 | |
| CN | 102518567 A | * | 6/2012 | |
| CN | 103754353 A | * | 4/2014 | |
| CN | 105035359 A | * | 11/2015 | |
| CN | 105150558 A | * | 12/2015 | |
| CN | 106182801 A | * | 12/2016 | |
| CN | 106570257 A | * | 4/2017 | B64C 3/185 |
| CN | 109016571 A | * | 12/2018 | B64C 3/20 |
| DE | 19836629 C1 | * | 10/1999 | B29D 99/0028 |
| DE | 102006027599 A1 | * | 12/2007 | F03D 1/0675 |
| EP | 2842867 A1 | * | 3/2015 | B64C 3/185 |
| FR | 1085142 | | 6/1953 | |
| FR | 3037315 A1 | * | 12/2016 | B64C 3/20 |
| GB | 447459 A | * | 5/1936 | B64C 3/00 |
| GB | 577790 A | * | 5/1946 | B29C 66/721 |
| GB | 871625 | | 6/1961 | |
| GB | 1166604 A | * | 10/1969 | B29D 99/0028 |
| GB | 2471408 | | 12/2010 | |
| JP | 54013571 A | * | 2/1979 | F03D 1/0675 |
| JP | 2011152753 A | * | 8/2011 | |
| NL | WO2018/143802 | | 8/2018 | |
| WO | WO-8502365 A1 | * | 6/1985 | B29C 70/44 |

\* cited by examiner

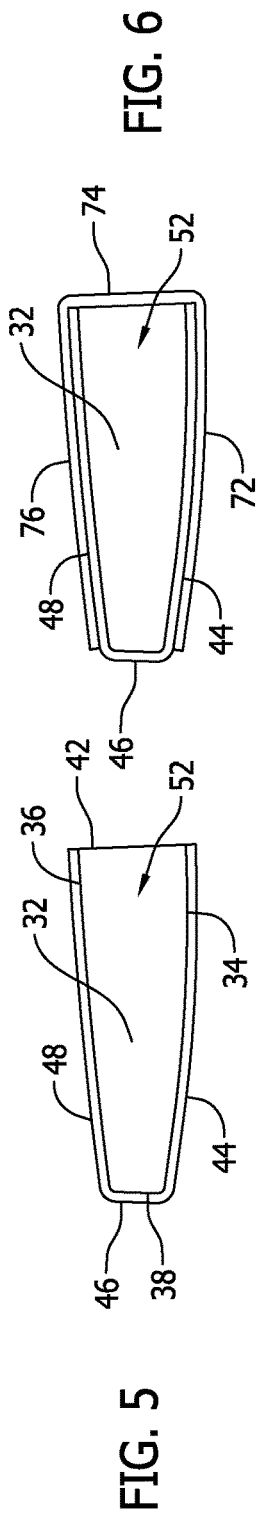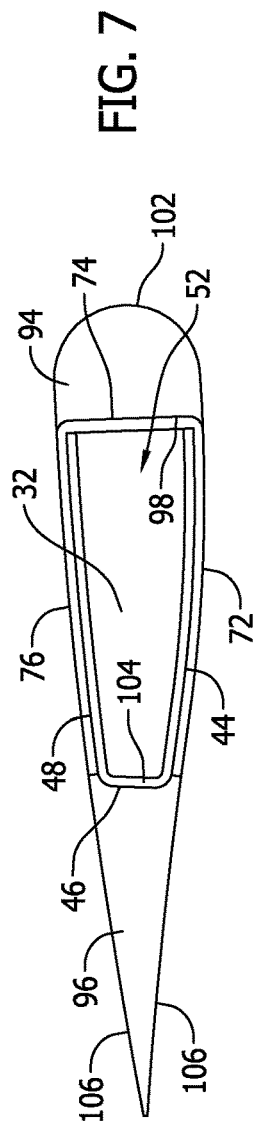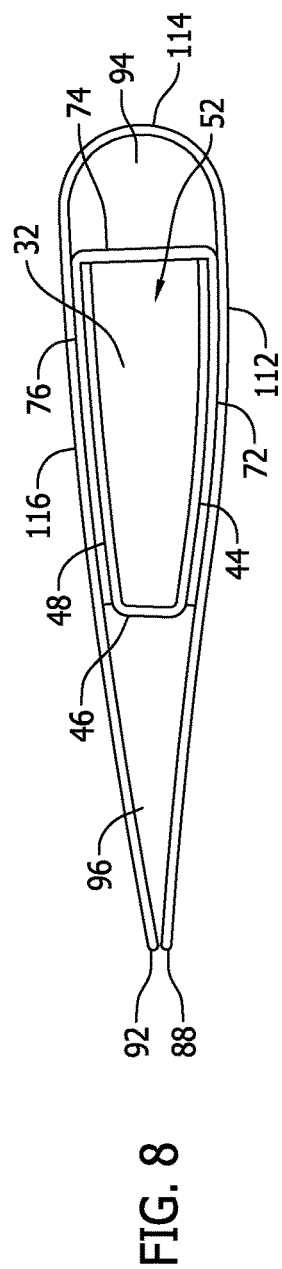

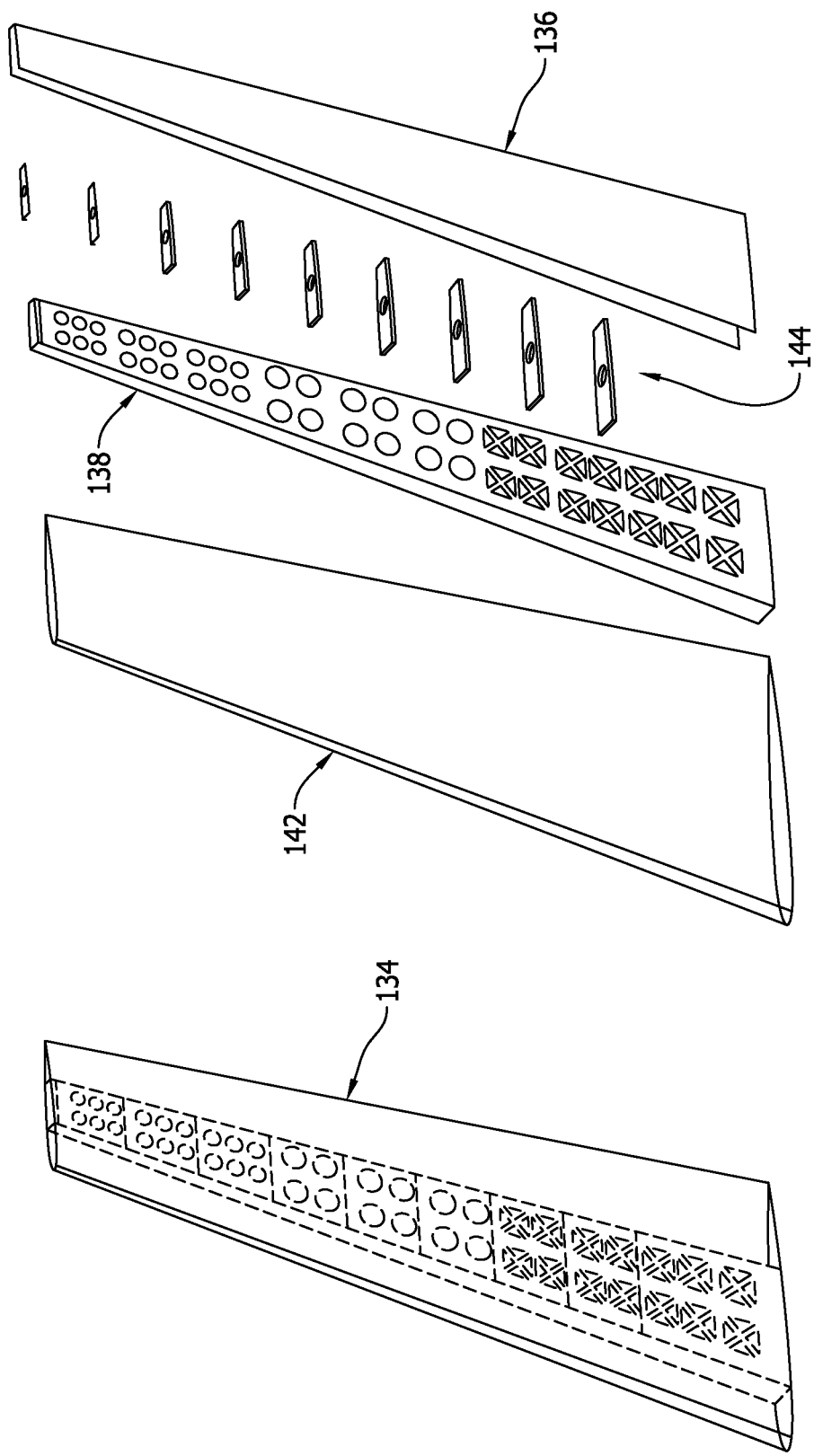

TRAILING EDGE FLAP HAVING A WAFFLE GRID INTERIOR STRUCTURE

FIELD

This disclosure pertains to the construction of a trailing edge flap of an aircraft wing. More specifically, this disclosure pertains to the composite construction of a trailing edge flap of an aircraft wing having a minimal internal support structure and a simplified laminate design.

BACKGROUND

A trailing edge flap of an aircraft wing is operable to increase the lift of the aircraft wing. The trailing edge flap is mounted to the trailing edge of the aircraft wing, and is selectively extended from the trailing edge of the aircraft wing or retracted into the trailing edge of the aircraft wing.

Extending the trailing edge flap from the trailing edge of the aircraft wing increases the surface area on the underside of the aircraft wing. This in turn increases the lift of the aircraft wing. The increased lift of the aircraft wing enables the aircraft to produce a required lift at a lower speed, for example at take-off speed.

Existing trailing edge flaps are constructed using many parts, and many fasteners. For example, an existing trailing edge flap could be constructed with thin aluminum skins extending across the upper surface and the lower surface of the flap and with many internal stiffening elements between the skins. The construction of such a flap with aluminum skins and with many fasteners securing the skins to the many internal stiffening elements is time consuming. The aluminum skins, the many fasteners and the many internal stiffening elements require extensive handling to manufacture the trailing edge flap. Additionally, the aluminum skins, the many fasteners and the many internal stiffening elements of existing trailing edge flaps also contribute to the weight of the trailing edge flap.

SUMMARY

The trailing edge flap and its method of construction of this disclosure reduces the amount of fasteners and stiffening elements in the construction of the trailing edge flap and reduces the manufacturing time of the trailing edge flap, thereby saving time of manufacture, reducing the cost of manufacture, and reducing the weight of the trailing edge flap.

The trailing edge flap is constructed of nested layers of material including an inner layer, a middle layer and an outer layer. The material is pre-preg composite material, but other types of materials could be used.

The inner layer of material has a folded cover configuration in the aircraft flap that monolithically forms the inner layer of material with a lower panel that is oriented horizontally, an intermediate panel that is oriented vertically and extends upwardly from the lower panel, and an upper panel that is oriented horizontally and extends from the intermediate panel over the lower panel. The lower panel, the intermediate panel and the upper panel extend around a hollow interior volume in the folded over configuration of the inner layer of material.

The middle layer of material has a folded over configuration in the aircraft flap around the inner layer of material. The folded over configuration of the middle layer of material forms the middle layer of material with a lower panel of the middle layer of material that is oriented horizontally and lays over and lays on the lower panel of the inner layer of material, an intermediate panel of the middle layer of material that is oriented vertically and extends upwardly from the lower panel of the middle layer of material and across the hollow interior volume in the folded over configuration of the inner layer of material, and an upper panel of the middle layer of material that is oriented horizontally and extends from the intermediate panel of the middle layer of material and lays over and lays on the upper panel of the inner layer of material.

The outer layer of material has a folded over configuration around the middle layer of material and around the inner layer of material in the aircraft flap. The folded over configuration of the outer layer of material monolithically forms the outer layer of material with a lower panel of the outer layer of material that is oriented horizontally and lays over and lays on the lower panel of the middle layer of material, an intermediate panel of the outer layer of material that is oriented vertically and extends upwardly from the lower panel of the outer layer of material and over the intermediate panel of the middle layer of material, and an upper panel of the outer layer of material that is oriented horizontally and extends from the intermediate panel of the outer layer of material and lays over and lays on the upper panel of the middle layer of material.

The intermediate panel of the inner layer of material forms a first spar in the interior of the aircraft flap, for example a rear spar. The intermediate panel of the middle layer of material forms a second spar in the interior of the aircraft flap, for example a front spar. The intermediate panel of the outer layer of material forms a portion of an exterior of the aircraft flap, for example a bullnose or a rounded, convex surface of the aircraft flap.

There are a plurality of holes through the lower panel of the middle layer of material. There are also a plurality of holes through the upper panel of the middle layer of material. These pluralities of holes remove composite material from the construction of the middle layer of material and reduce the weight of the aircraft flap.

There is an internal support structure in the hollow interior volume of the folded over configuration of the inner layer of material. The internal support structure includes a first rib in the hollow interior volume in the folded over configuration of the inner layer of material. The first rib is secured to the inner layer of material. The internal support structure also includes a second rib in the hollow interior volume in the folded over configuration of the inner layer of material. The second rib is secured to the inner layer of material. The internal support structure further includes an intermediate spar or a midspar in the hollow interior volume in the folded over configuration of the inner layer of material. The midspar is positioned between the first spar and the second spar. The midspar extends between the first rib and the second rib and is secured to the first rib and the second rib.

The aircraft flap construction method involves nesting the layers of composite material, the inner layer, the middle layer and the outer layer in the aircraft flap. The layers of composite material are layers of pre-preg composite material. Other types of composite materials and other equivalent materials could be used.

The construction method involves laying up the inner layer of material in a folded over configuration around a central mandrel that monolithically forms the inner layer of material with a lower panel, an intermediate panel that extends upwardly from the lower panel and an upper panel that extends from the intermediate panel over the mandrel and over the lower panel. The lower panel, the intermediate panel and the upper panel of the inner layer of material extending around the central mandrel form the inner layer of material extending around a hollow interior volume in the folded over configuration of the inner layer of material.

The construction method further involves laying up the middle layer of material in the folded over configuration around the inner layer of material that monolithically forms the middle layer of material with a lower panel of the middle layer of material that lays over and lays on the lower panel of the inner layer of material, an intermediate panel of the middle layer of material that extends across the hollow interior volume in the folded over configuration of the inner layer of material, and an upper panel of the middle layer of material that lays over and lays on the upper panel of the inner layer of material.

The construction method still further involves laying up the outer layer of material in a folded over configuration around the middle layer of material that monolithically forms the outer layer of material with a lower panel of the outer layer of material that lays over and lays on the lower panel of the middle layer of material, an intermediate panel of the outer layer of material that extends over the intermediate panel of the middle layer of material, and an upper panel of the outer layer of material that lays over and lays on the upper panel of the intermediate layer of material.

Prior to the middle layer of material being laid up in the folded over configuration around the inner layer of material, a plurality of holes are formed through the lower panel of the middle layer of material and through the upper panel of the middle layer of material. The composite material removed from the lower panel of the middle layer of material and the upper panel of the middle layer of material reduces the weight of the aircraft flap.

Forming the intermediate panel of the inner layer of material as a first spar, for example a rear spar of the aircraft flap and forming the intermediate panel of the middle layer of material as a second spar, for example a front spar of the aircraft flap minimizes the internal support structure of the aircraft flap and simplifies the laminate design.

The features, functions, and advantages that have been discussed can be achieved independently in various examples or may be combined in yet other examples, further details of which can be seen with reference to the following description and drawings.

BRIEF DESCRIPTION OF THE DRAWINGS

FIG. 5 is a representation of an end elevation view of an inner layer of the trailing edge flap being formed on a central mandrel.

FIG. 6 is a representation of an end elevation view of a middle layer of the trailing edge flap being formed on the mandrel FIG. 7 is a representation of an end elevation view of a forward mandrel and rearward mandrel being attached to the middle layer of the trailing edge flap.

FIG. 8 is a representation of an end elevation view of an outer layer of the trailing edge flap being formed on the forward mandrel, the central mandrel and the aft mandrel.

FIG. 9 is a representation of an end elevation view of the inner layer, the middle layer and the outer layer of the trailing edge flap removed from the mandrels of FIGS. 7 and 8.

FIG. 16 is a representation of a perspective view of a tail rudder of this disclosure.

FIG. 17 is a representation of a perspective view of component parts of a tail rudder of an aircraft assembled with an internal support structure, an inner layer, a middle layer and an outer layer.

DETAILED DESCRIPTION

Figure 1:
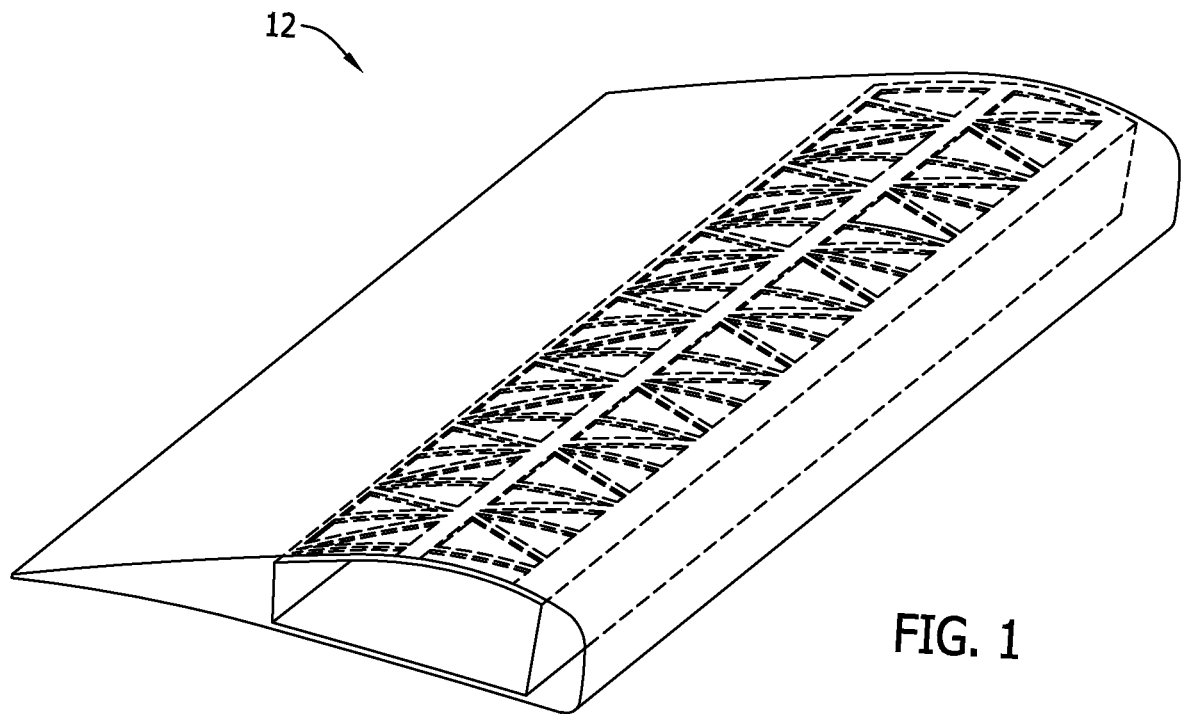
FIG. 1 is a representation of a perspective view of the trailing edge flap of this disclosure.

FIG. 1 is a representation of a perspective view of the trailing edge flap 12 of this disclosure. The trailing edge flap 12 is constructed of nested layers of composite material including an inner layer 14, a middle layer 16 and an outer layer 18. In this disclosure, the composite material of each of the inner layer 14, the middle layer 16 and the outer layer 18 is pre-preg composite material. However, other types of composite materials could be employed in constructing the layers to be described, and materials other than composite materials could be employed.

Figure 2:
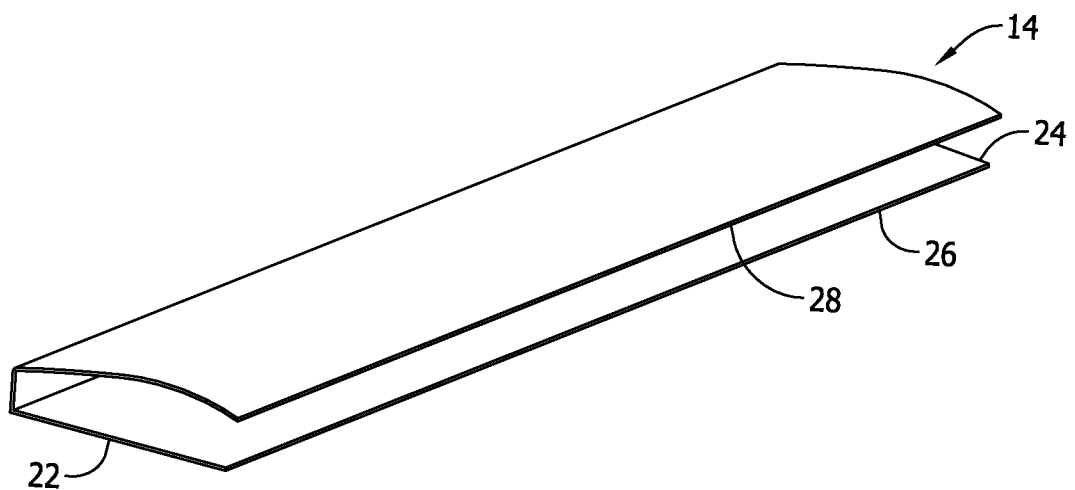
FIG. 2 is a representation of a perspective view of an inner layer of the trailing edge flap of FIG. 1.

FIG. 2 is a representation of a perspective view of the inner layer 14 of material removed from the construction of the trailing edge flap 12 of FIG. 1. The inner layer 14 of material could be a single sheet or single ply of composite material such as pre-preg composite material, or several plies of composite material. The inner layer 14 of material has a general rectangular configuration with a longitudinal length that extends between an inboard edge 22 and an opposite outboard edge 24 of the inner layer 14 of material, and a lateral width between a lower edge 26 and an opposite upper edge 28 of the inner layer 14 of material. The longitudinal length of the inner layer 14 of material will extend along the longitudinal length of the trailing edge flap 12 to be constructed. The relative length and width dimensions of the inner layer 14 of material represented in FIG. 2 are only examples. The relative length and width dimensions of the inner layer 14 will change, depending on the length and width dimensions of the trailing edge flap being constructed. As represented in FIG. 2, the inner layer 14 of material is formed in a folded over configuration. By "folded over configuration", what is meant is that a portion of the inner layer 14 of material adjacent the upper edge 28 is doubled over or positioned over a portion of the inner layer 14 of material adjacent the lower edge 26. The folded over configuration of the inner layer 14 of material represented in FIG. 2 is achieved by folding the inner layer 14 of material over a central mandrel.

FIG. 5 is a representation of an end elevation view of the inner layer 14 of material folded over a central mandrel 32. The central mandrel 32 has a bottom surface 34 and an opposite top surface 36, a first side surface 38 and an opposite second side surface 42. The central mandrel 32 will have a length dimension depending on the length dimension of the trailing edge flap being constructed. As represented in FIG. 5, the inner layer 14 of material is folded over the central mandrel 32 to form the folded over configuration of the inner layer 14. The folded over configuration of the inner layer 14 of material forms the inner layer with a lower panel 44 on the bottom surface 34 of the central mandrel 32, an intermediate panel 46 on the first side surface 38 of the central mandrel and an upper panel 48 on the top surface 36 of the central mandrel 32. Folding the inner layer 14 of material on the central mandrel 32 monolithically forms the inner layer 14 of material with the lower panel 44 oriented horizontally, the intermediate panel 46 oriented vertically and extending upwardly from the lower panel 44, and the upper panel 48 oriented horizontally and extending from the intermediate panel 46 over the lower panel 44. The lower panel 44, the intermediate panel 46 and the upper panel 48 of the inner layer 14 of material extend around a hollow interior volume 52 in the folded over configuration of the inner layer 14 of material.

Figure 3:
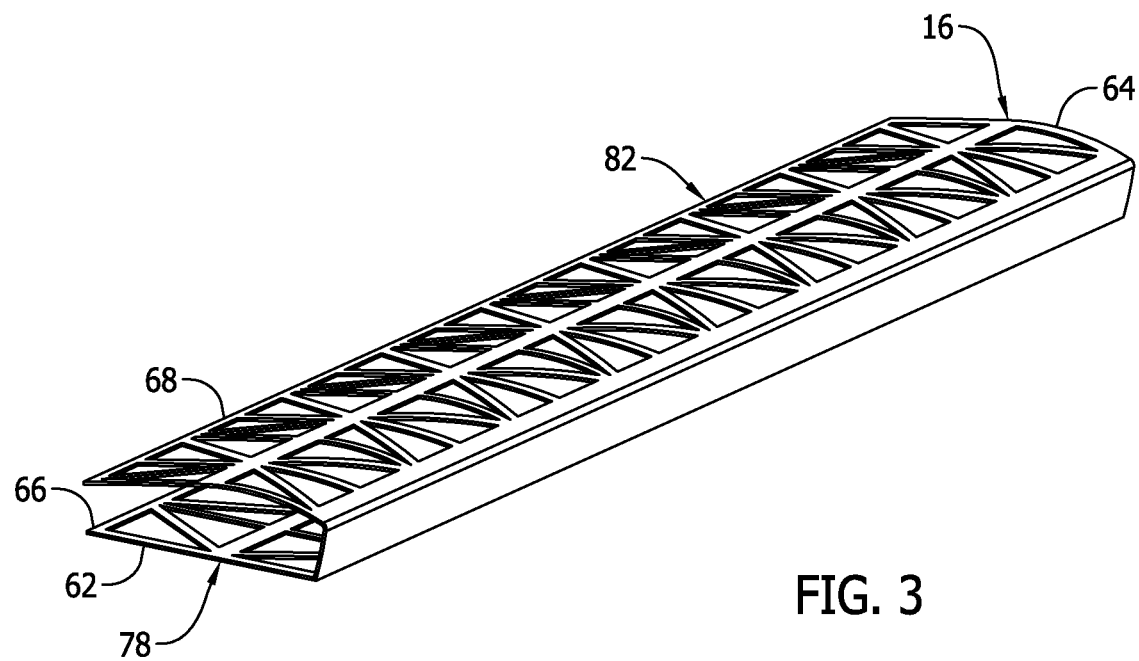
FIG. 3 is a representation of a perspective view of a middle layer of the trailing edge flap of FIG. 1.

FIG. 3 is a representation of a perspective view of the middle layer 16 of material removed from the construction of the trailing edge flap 12 of FIG. 1. As with the inner layer 14 of material, the middle layer 16 of material could be a single sheet or single ply of composite material such as pre-prep composite material, or several plies of composite material. The representation of the middle layer 16 of material in FIG. 3 has a general rectangular configuration with a longitudinal length that extends between an inboard edge 62 and an opposite outboard edge 64 of the middle layer 16 of material, and a lateral width between a lower edge 66 and an opposite upper edge 68 of the inner layer 16 of material. The rectangular configuration of the middle layer 16 of material is only one example of a possible configuration. The configuration of the middle layer 16 of material will change depending on the configuration of the trailing edge flap being constructed. As with the inner layer 14 of material, the longitudinal length of the middle layer 16 of material will extend along the longitudinal length of the trailing edge flap 12 to be constructed. The relative length and width dimensions of the middle layer 16 of material represented in FIG. 3 are only examples. The relative length and width dimensions of the middle layer 16 of material will change, depending on the length and width dimensions of the trailing edge flap being constructed. As represented in FIG. 3, the middle layer 16 of material is formed in a folded over configuration. By "folded over configuration", what is meant is that a portion of the middle layer 16 of material adjacent the upper edge 68 is doubled over or positioned over a portion of the middle layer 16 of material adjacent the lower edge 66. The folded over configuration of the middle layer 16 of material represented in FIG. 3 is achieved by folding the middle layer 16 of material over the inner layer 14 of material on the central mandrel 32.

FIG. 6 is a representation of an end elevation view of the middle layer 16 of material folded over the inner layer 14 of material which has been previously folded over the central mandrel 32. Prior to the middle layer 16 being folded over the inner layer 14, a release agent is applied onto the lower panel 44 of the inner layer, the intermediate panel 46 of the inner layer and the upper panel 48 of the inner layer. The middle layer 16 is then folded over the inner layer 14 to form the folded over configuration of the middle layer 16. The folded over configuration of the middle layer 16 of material forms the middle layer with a lower panel 72 that lays over and lays on the lower panel 44 of the inner layer 14, an intermediate panel 74 that lays over and lays on the second side surface 42 of the central mandrel 32, and an upper panel 76 that lays over and lays on the upper panel 48 of the inner layer 14. Forming the middle layer 16 of material on the inner layer 14 of material that has been previously folded over the central mandrel 32 monolithically forms the middle layer 16 of material with the lower panel 72 of the middle layer oriented horizontally, the intermediate panel 74 of the middle layer oriented vertically and extending upwardly from the lower panel 72 of the middle layer, and the upper panel 76 oriented horizontally and extending from the intermediate panel 74 over the lower panel 72 of the middle layer and on the upper panel 48 of the inner layer 14. The lower panel 72, the intermediate panel 74 and the upper panel 76 of the middle layer 16 of material extend around the inner layer 14 of material and around the hollow interior volume 52 in the folded over configuration of the inner layer 14 of material.

As represented in FIG. 3, there are a plurality of holes 78 through the lower panel 72 of the middle layer 16. Each of the holes in the plurality of holes 78 has a polygonal configuration. There is also a plurality of holes 82 formed through the upper panel 76 of the middle layer 16. Each of the holes in this plurality of holes 82 also has a polygonal configuration. The pluralities of holes 78, 82 are formed in the middle layer 16 of material at a later manufacturing step of the middle layer of material. The plurality of holes 78, 82 remove composite material from the construction of the middle layer 16 of material and thereby reduce the weight of the middle layer 16 of material and the weight of the trailing edge flap 12 constructed with the middle layer 16 of material.

Figure 4:
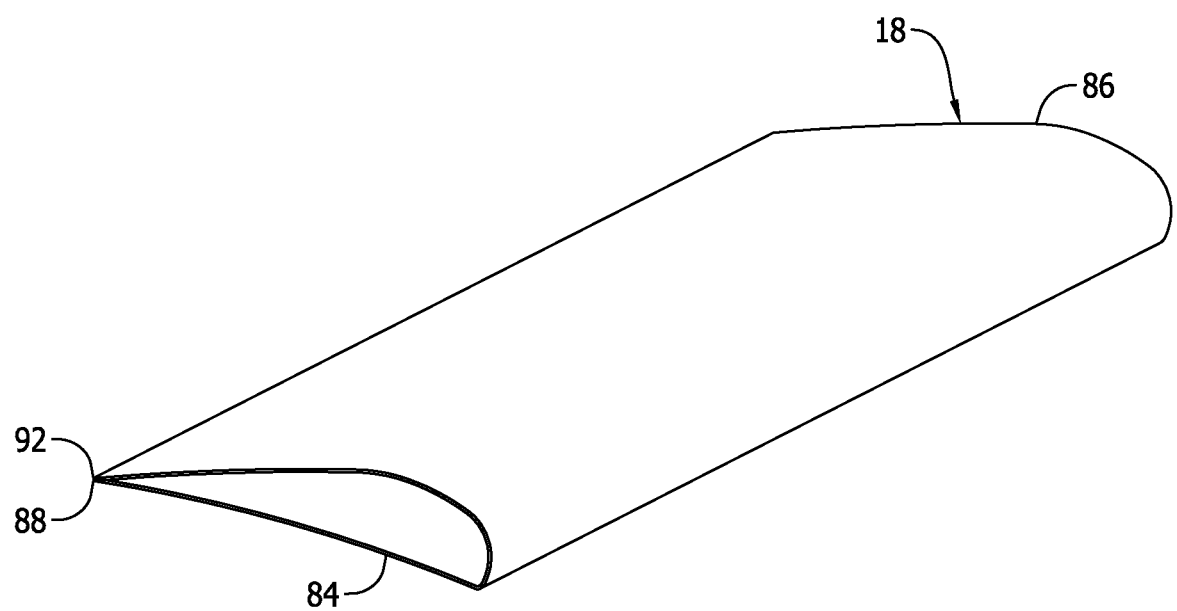
FIG. 4 is a representation of a perspective view of an outer layer of the trailing edge flap of FIG. 1.

FIG. 4 is a representation of a perspective view of the outer layer 18 of material removed from the construction of the trailing edge flap 12 of FIG. 1. As with the inner layer 14 of material and the middle layer 16 of material, the outer layer 18 of material could be a single sheet or single ply of composite material such as pre-preg composite material, or several plies of composite material. As represented in FIG. 4, the outer layer 18 of material has a general rectangular configuration with a longitudinal length that extends between an inboard edge 84 and an opposite outboard edge 86 of the outer layer 18 of material and a lateral width between a lower edge 88 and an opposite upper edge 92 of the outer layer 18 of material. The longitudinal length of the outer layer 18 of material will extend along the longitudinal length of the trailing edge flap to be constructed. The relative length and width dimensions of the outer layer 18 of material represented in FIG. 4 are only examples. The relative length and width dimensions of the outer layer 18 of material will change, depending on the length and width dimensions of the trailing edge flap being constructed. As represented in FIG. 4, the outer layer 18 of material is formed in a folded over configuration. By "folded over configuration", what is meant is that a portion of the outer layer 18 of material adjacent the upper edge 92 is doubled over or positioned over a portion of the outer layer 18 of material adjacent the lower edge 88. The folded over configuration of the outer layer 18 of material represented in FIG. 4 is achieved by folding the outer layer 18 of material over the middle layer 16 of material, over the inner layer 14 of material and over the central mandrel 32.

Prior to the outer layer 18 of material being folded in its folded over configuration on the middle layer 16 of material, the inner layer 14 of material and the central mandrel 32, a forward mandrel 94 and an aft mandrel 96 are added to the central mandrel 32.

As represented in FIG. 7, the forward mandrel 94 has a flat rear surface 98 that is positioned against the middle layer intermediate panel 74. The forward mandrel 94 also has a front surface 102 that projects outwardly from the flat rear surface 98. The front surface 102 has a general semi-circular configuration in cross-section. The forward mandrel 94 will have a length dimension depending on the length dimension of the trailing edge flap being constructed.

The aft mandrel 96 has a front surface 104 that is positioned against the intermediate panel 46 of the inner layer 14. The aft mandrel 96 has rear surfaces 106 that project rearwardly from the front surface 104. The rear surfaces 106 give the aft mandrel 96 a triangular configuration in cross-section. The aft mandrel 96 will have a length dimension depending on the length dimension of the trailing edge flap being constructed.

FIG. 8 is a representation of an end elevation view of the outer layer 18 of material folded over the forward mandrel 94, the middle layer 16 of material folded over the inner layer 14 of material and the central mandrel 32, and the aft mandrel 96. Prior to the outer layer 18 of material being folded over the forward mandrel 94, the middle layer 16 of material and the aft mandrel 96, a release agent, for example a release film is applied over the forward mandrel front surface 102, the middle layer lower panel 72, the middle layer upper panel 76 and the aft mandrel rear surfaces 106. As represented in FIG. 8, the outer layer 18 of material is folded over the forward mandrel 94, the middle layer lower panel 72, the middle layer upper panel 76 and the aft mandrel 96 to form the folded over configuration of the outer layer 18 of material. The folded over configuration of the outer layer 18 forms the outer layer with a lower panel 112 that lays over and lays on the lower panel 72 of the middle layer 16 and on the rear surface 106 of the aft mandrel 96, an intermediate panel 114 on the front surface 102 of the forward mandrel 94, and an upper panel 116 that lays over and lays on the upper panel 76 of the middle layer 16 of material and on the rear surface 106 of the aft mandrel 96. Folding the outer layer 18 of material on the forward mandrel 94, the middle layer 16 of material and the aft mandrel 96 monolithically forms the outer layer 18 of material with the lower panel 112 oriented horizontally, the intermediate panel 114 oriented vertically and extending upwardly from the lower panel 112, and the upper panel 116 oriented horizontally and extending from the intermediate panel 114 over the lower panel 112. The lower panel 112, the intermediate panel 114 and the upper panel 116 of the outer layer 18 of material extend around the hollow interior volume 52 in the folded over configuration of the inner layer of material 14. The inner layer 14 of material, the middle layer 16 of material and the outer layer 18 of material assembled on the central mandrel 32, the forward mandrel 94 and the aft mandrel 96 as represented in FIG. 8 are then put through an autoclave process. The autoclave process subjects the inner layer 14 of material, the middle layer 16 of material and the outer layer 18 of material to heat and pressure that cure the inner layer 14 of material, the middle layer 16 of material and the outer layer 18 of material. Following the autoclave process, the inner layer 14 of material, the middle layer 16 of material and the outer layer 18 of material are then removed from the central mandrel 32, the forward mandrel 94 and the aft mandrel 96. FIG. 9 is a representation of end elevation views of the inner layer 14 of material, the middle layer 16 of material and the outer layer 18 of material after removal from the mandrels.

Figure 10:
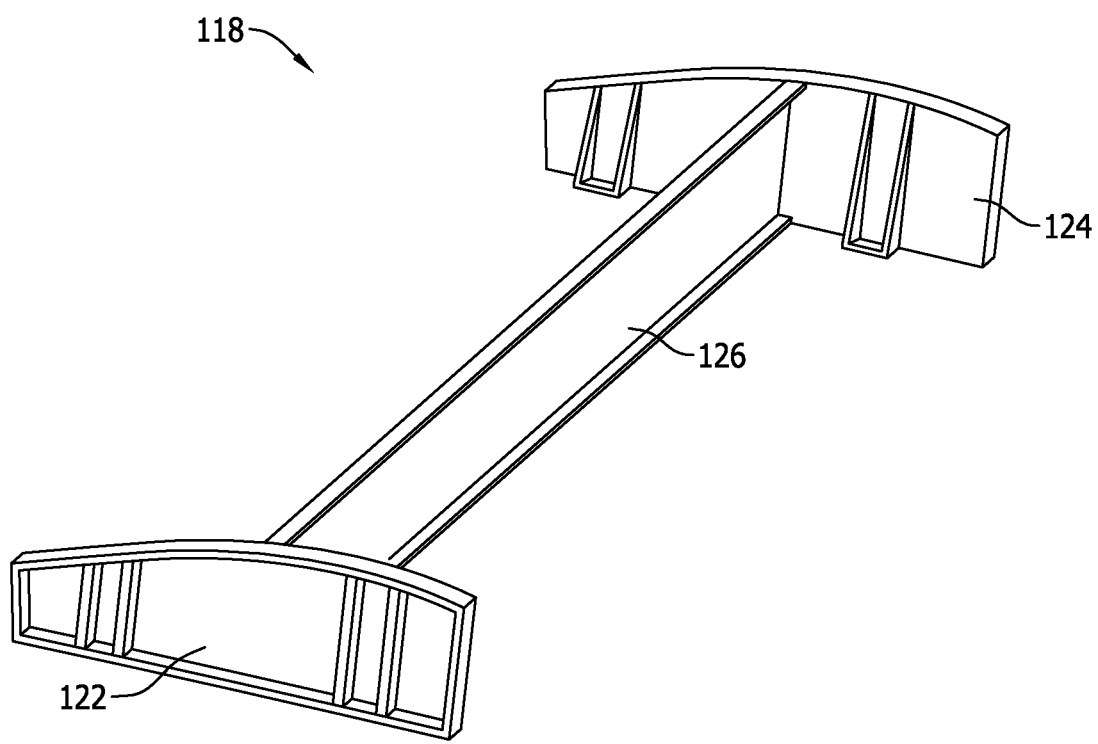
FIG. 10 is a representation of a perspective view of an internal support structure of the trailing edge flap.

FIG. 10 is a representation of a perspective view of an internal support structure 118 of the trailing edge flap 12. The internal support structure 118 includes a first rib 122. The first rib 122 is constructed of metal or other equivalent material. The first rib 122 has an exterior or peripheral surface configuration that conforms to the interior surface of the inner layer 14 of material represented in FIG. 9. The internal support structure 118 also includes a second rib 124. The second rib 124 has an exterior or a peripheral surface configuration that is substantially the same as that of the first rib 122. The second rib 124 is also constructed of a metal or other equivalent material. The exterior surface configuration of the second rib 124 also conforms to the configuration of the interior surface of the inner layer 14 of material as represented in FIG. 9. The internal support structure 118 further includes an intermediate spar or a midspar 126. The midspar 126 is constructed of a composite material or other equivalent material. As represented in FIG. 10, the midspar 126 extends between the first rib 122 and the second rib 124 and is secured to the first rib 122 and the second rib 124.

Figure 11:
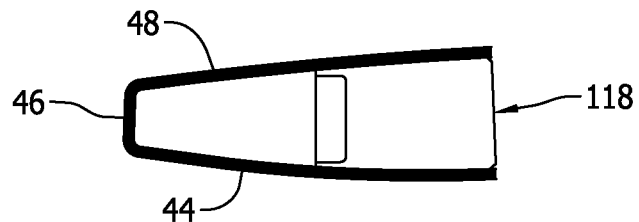
FIG. 11 is a representation of an end elevation view of the internal support structure assembled to the inner layer.

In constructing the trailing edge flap 12, the internal support structure 118 is positioned in the hollow interior volume 52 of the inner layer 14 of material. FIG. 11 is a representation of an end elevation view of the internal support structure 118 inserted into the hollow interior volume 52 of the inner layer 14 of material. The first rib 122 is secured to the inner layer 14 of material by fasteners, or other equivalent means. The second rib 124 is secured to the inner layer 14 of material by fasteners or by other equivalent means.

Figure 12:
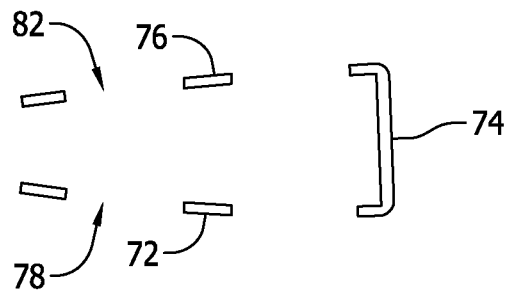
FIG. 12 is a representation of an end elevation view of holes machined through the middle layer.

The plurality of holes 78 are then formed through the lower panel 72 of the middle layer 16 of material. The plurality of holes 82 represented in FIG. 3 are also formed through the upper panel 76 of the middle layer 16 of material. The pluralities of holes 78, 82 have polygonal configurations as represented in FIG. 3. This positions the edges of the plurality of holes 78, 82 parallel with the fibers of the composite material of the middle layer 16 of material. The pluralities of holes 78, 82 remove composite material from the construction of the middle layer 16 of material and reduce the weight of the middle layer 16 of material and reduce the weight of the trailing edge flap 12. FIG. 12 is a representation of an elevation, cross-section view through the middle layer 16 of material with the plurality of holes 78 through the lower panel 72 of the middle layer 16 of material and the plurality of holes 82 through the upper panel 76 of the middle layer 16 of material.

Figure 13:
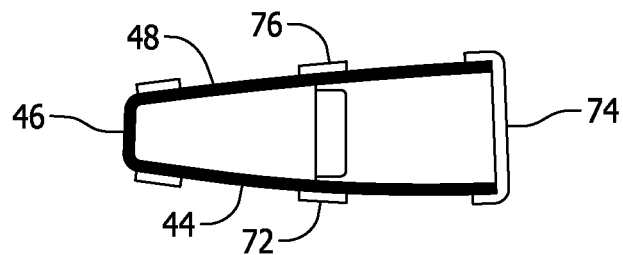
FIG. 13 is a representation of the middle layer assembled to the inner layer and the internal support structure.

FIG. 13 is a representation of an end elevation view of the middle layer 16 of material assembled onto the inner layer 14 of material that had previously been secured to the internal support structure 118 positioned in the hollow interior volume 52 of the inner layer 14 of material. The middle layer 16 of material is assembled onto the inner layer 14 of material as represented in FIG. 13 with a layer of film adhesive between the engaging surfaces of the middle layer 16 of material and the inner layer 14 of material. Following the autoclave process, the inner layer 14 of material, the middle layer 16 of material and the outer layer 18 of material represented in FIG. 9 are resilient. This enables the inner layer 14 of material, the middle layer 16 of material and the outer layer 18 of material to be assembled to each other.

Figure 14:
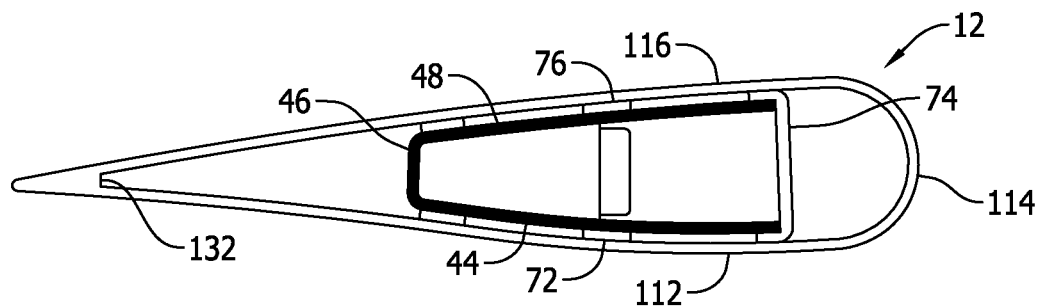
FIG. 14 is a representation of an end elevation view of the outer layer assembled to the middle layer, the inner layer and the internal support structure.

With the middle layer 16 of material assembled in its folded over configuration on the inner layer 14 of material, the outer layer 18 of material is assembled in its folded over configuration on the middle layer 16 of material. Prior to the outer layer 18 of material being assembled on the middle layer 16 of material, a film of adhesive is applied between the engaging surfaces of the outer layer 18 of material and the middle layer 16 of material. FIG. 14 is a representation of an end view of the outer layer 18 of material assembled on the middle layer 16 of material. With the outer layer 18 of material assembled on the middle layer 16 of material as represented in FIG. 14, a wedge piece 132 of composite material is positioned between the lower panel 112 of the outer layer 18 of material and the upper panel 116 of the outer layer 18 of material at the lower edge 88 of the outer layer 18 of material and the upper edge 92 of the outer layer 18 of material. The positioning of the wedge piece 132 is represented in FIG. 14.

Figure 15:
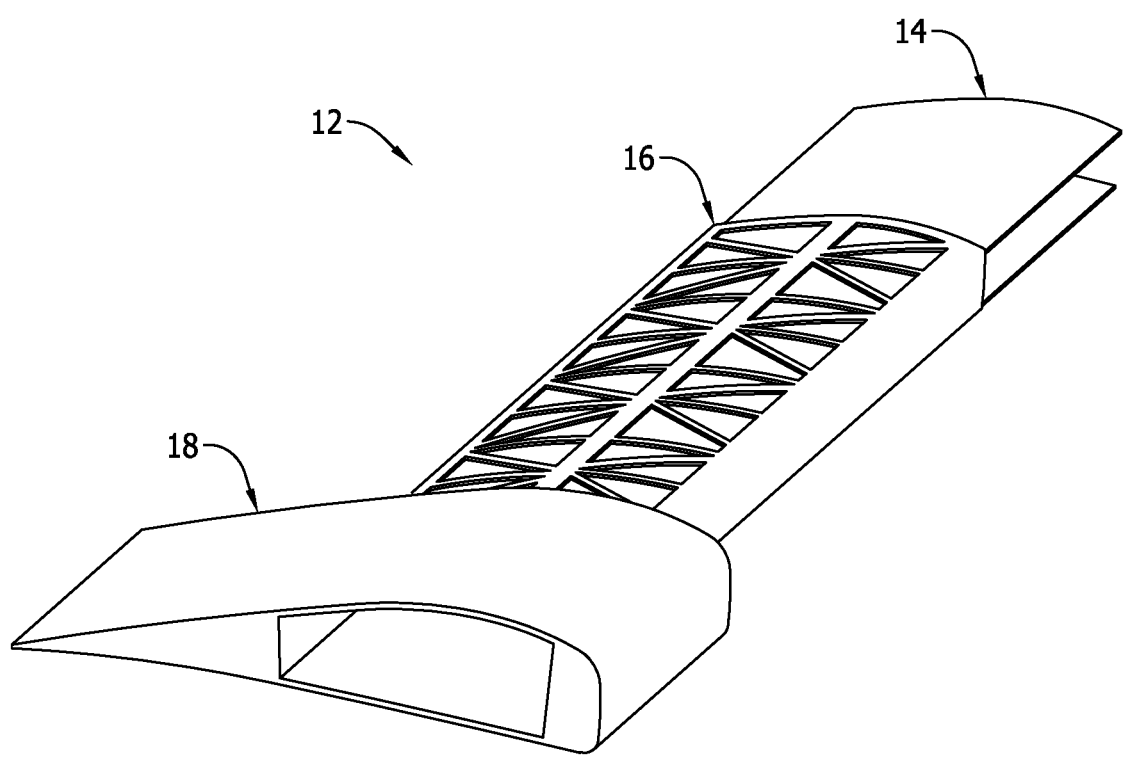
FIG. 15 is a representation of a perspective view of the trailing edge flap with portions of the outer layer and the middle layer removed to illustrate the construction of the trailing edge flap.

The assembled internal support structure 118, the inner layer 14 of material, the middle layer 16 of material, the outer layer 18 of material and the wedge piece 132 represented in FIG. 14 are then vacuum bagged and again autoclaved. This forms a secondary cure bond between the inner layer 14 of material, the middle layer 16 of material, the outer layer 18 of material and the wedge piece 132. Following the second autoclave process the construction of the trailing edge flap 12 is completed. FIG. 15 is a representation of a perspective view of the trailing edge flap 12 with portions of the outer layer 18 and middle layer 16 removed to illustrate the construction of the trailing edge flap 12. In the completed construction of the trailing edge flap 12, the intermediate panel 46 of the inner layer 14 of material forms a first spar or rear spar in the trailing edge flap 12, the intermediate panel 74 of the middle layer 16 of material forms a second spar or front spar in the trailing edge flap 12, and the intermediate panel 114 of the outer layer 18 of material forms a bullnose of the trailing edge flap 12.

Although this disclosure describes the construction of the trailing edge flap 12, the concepts of this disclosure can also be employed in constructing other structures of an aircraft. For example, the concepts of this disclosure could be employed in constructing a vertical tail and rudder assembly of an aircraft. FIG. 16 is a representation of the component parts that would go into the construction of the tail rudder 134. FIG. 16 is a representation of the inner 136 layer of material, the middle layer 138 of material and the outer layer 142 of material that are each constructed of composite materials, for example pre-preg composite material. The tail rudder 134 also has an internal support structure in the form of a plurality of ribs 144. The ribs 144 are constructed of metal, or other equivalent material. The inner layer 136 of material, the middle layer 138 of material, the outer layer 142 of material and the ribs 144 are assembled together in the same manner as the construction of the trailing edge flap 12 to produce the tail rudder 134.

As various modifications could be made in the construction of the trailing edge flap and its method of construction herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above described examples, but should be defined only in accordance with the following claims appended hereto and their equivalents.

The invention claimed is:

1. An aircraft flap of an aircraft wing, the aircraft flap comprising:
nested layers of composite material in an aircraft flap of an aircraft wing including an inner layer, a middle layer and an outer layer;
the inner layer having a folded over configuration in the aircraft flap that monolithically forms a lower panel, an intermediate panel that extends upwardly from the lower panel and an upper panel that extends from the intermediate panel over the lower panel, the lower panel, the intermediate panel and the upper panel extend around a hollow interior volume in the folded over configuration of the inner layer, the intermediate panel of the inner layer forming a first spar;
the middle layer having a folded over configuration in the aircraft flap that monolithically forms a lower panel of the middle layer that lays over the lower panel of the inner layer, an intermediate panel of the middle layer that extends across the hollow interior volume in the folded over configuration of the inner layer, and an upper panel of the middle layer that lays over the upper panel of the inner layer, the intermediate panel of the middle layer forming a second spar;
the outer layer having a folded over configuration in the aircraft flap that monolithically forms a lower panel of the outer layer that lays over the lower panel of the middle layer, an intermediate panel of the outer layer that extends over the intermediate panel of the middle layer, and an upper panel of the outer layer that lays over the upper panel of the middle layer; and
an internal support structure in the hollow interior volume in the folded over configuration of the inner layer, the internal support structure including a first rib secured to the lower panel and the upper panel of the inner layer, a second rib secured to the lower panel and the upper panel of the inner layer, and a midspar positioned between the first spar and the second spar, the midspar secured to and extending between the first rib and the second rib.

2. The aircraft flap of claim 1,
wherein the first spar is a rear spar and the second spar is a front spar.

3. The aircraft flap of claim 2,
wherein the intermediate panel of the outer layer forms a rounded, convex surface.

4. The aircraft flap of claim 3,
wherein the lower panel and the upper panel of the outer layer form a lower surface and an upper surface of the aircraft flap, respectively.

5. The aircraft flap of claim 1, further comprising:
the first rib having a peripheral surface configuration that conforms to an interior surface of the inner layer of material; and
the second rib having a peripheral configuration that conforms to the interior surface of the inner layer of material.

6. The aircraft flap of claim 1, further comprising:
a plurality of holes through the lower panel of the middle layer; and,
a plurality of holes through the upper panel of the middle layer.

7. The aircraft flap of claim 6,
wherein each hole of the plurality of holes has a polygonal configuration, the polygonal configuration of each hole of the plurality of holes positioning edges of each hole of the plurality of holes parallel with fibers of the composite material of the middle layer.

8. An aircraft flap of an aircraft wing, the aircraft flap comprising:
an inner layer of material in a folded over configuration in an aircraft flap of an aircraft wing, the folded over configuration forming the inner layer of material with a lower panel that is oriented horizontally, an intermediate panel that is oriented vertically and extends upwardly from the lower panel, and an upper panel that is oriented horizontally and extends from the intermediate panel over the lower panel, the lower panel, the intermediate panel and the upper panel extend around a hollow interior volume in the folded over configuration of the inner layer of material, the intermediate panel of the inner layer forming first spar;
a middle layer of material in a folded over configuration around the inner layer of material, the folded over configuration forming the middle layer of material with a lower panel of the middle layer of material that is oriented horizontally and lays on the lower panel of the inner layer of material, an intermediate panel of the middle layer of material that is oriented vertically and extends upwardly from the lower panel of the middle layer of material and across the hollow interior volume in the folded over configuration of the inner layer of material, and an upper panel of the middle layer of material that is oriented horizontally and extends from the intermediate panel of the middle layer of material and lays on the upper panel of the inner layer of material, the intermediate panel of the middle layer forming a second spar;
an outer layer of material in a folded over configuration around the middle layer of material and around the inner layer of material, the folded over configuration of the outer layer of material forming the outer layer of material with a lower panel that is oriented horizontally and lays on the lower panel of the middle layer of material, an intermediate panel of the outer layer of material that is oriented vertically and extends upwardly from the lower panel of the outer layer of material and over the intermediate panel of the middle layer of material, and an upper panel of the outer layer of material that is oriented horizontally and extends from the intermediate panel of the outer layer of material and lays on the upper panel of the middle layer of material, the intermediate panel of the outer layer forming an outer surface of the aircraft flap;
a first rib in the hollow interior volume in the folded over configuration of the inner layer of material, the first rib being secured to the inner layer of material;
a second rib in the hollow interior volume in the folded over configuration of the inner layer of material, the second rib being secured to the inner layer of material; and
a midspar in the hollow interior volume in the folded over configuration of the inner layer of material, the midspar is positioned between the first spar and the second spar, the midspar being secured to and extending between the first rib and the second rib.

9. The aircraft flap of claim 8,
wherein the first spar is a rear spar and the second spar is a front spar.

10. The aircraft flap of claim 9
wherein the outer surface formed b the intermediate panel of the outer layer is a rounded, convex surface.

11. The aircraft flap of claim 10
wherein the lower panel and the upper panel of the outer layer form a lower surface and an upper surface of the aircraft flap, respectively.

12. The aircraft flap of claim 8, further comprising:
the first rib having a peripheral surface configuration that conforms to an interior surface of the inner layer of material; and
the second rib having a peripheral configuration that conforms to the interior surface of the inner layer of material.

13. The aircraft flap of claim 8
wherein the lower panel, the intermediate panel, and the upper panel of the inner layer are monolithically formed.

14. The aircraft flap of claim 13
wherein the lower panel, the intermediate panel, and the upper panel of the middle layer are monolithically formed.

15. The aircraft flap of claim 14
wherein the lower panel, the intermediate panel, and the upper panel of the outer layer are monolithically formed.

16. The aircraft flap of claim 8, wherein
the inner layer of material being a composite material;
the middle layer of material being a composite material; and,
the outer layer of material being a composite material.

17. The aircraft flap of claim 16, further comprising:
a plurality of holes through the lower panel of the middle layer of material, the plurality of holes through the lower panel of the middle layer have polygonal configurations that position edges of the plurality of holes through the lower panel of the middle layer parallel with fibers of the composite material of the middle layer; and
a plurality of holes through the upper panel of the middle layer of material, the plurality of holes through the upper panel of the middle layer having polygonal configurations that position edges of the plurality of holes through the upper panel of the middle layer parallel with fibers of the composite material of the middle layer.

18. A method of constructing an aircraft flap for an aircraft wing, the method comprising:
nesting layers of materials in an aircraft flap of an aircraft wing including an inner layer, a middle layer and an outer layer;
laying up the inner layer in a folded over configuration around a central mandrel that monolithically forms the inner layer with a lower panel, an intermediate panel that extends upwardly from the lower panel and an upper panel that extends from the intermediate panel over the lower panel, the lower panel, the intermediate panel and the upper panel extending around a hollow interior volume in the folded over configuration of the inner layer, the intermediate panel of the inner layer forms a first spar;
laying up the middle layer in a folded over configuration around the inner layer that monolithically forms the middle layer with a lower panel of the middle layer that lays over the lower panel of the inner layer, an intermediate panel of the middle layer that extends across the hollow interior volume in the folded over configuration of the inner layer, and an upper panel of the middle layer that lays over the upper panel of the inner layer, the intermediate panel of the middle layer forms a second spar;

laying up the outer layer in a folded over configuration around the middle layer that monolithically forms the outer layer with a lower panel of the outer layer that lays over the lower panel of the middle layer, an intermediate panel of the outer layer that extends over the intermediate panel of the middle layer, and an upper panel of the outer layer that lays over the upper panel of the middle layer;

positioning an internal support structure in the hollow interior volume in the folded over configuration of the inner layer, the internal support structure comprising a first rib, a second rib, and a midspar positioned between the first spar and the second spar, the midspar being secured to and extending between the first rib and the second rib;

securing the first rib to the lower panel and the upper panel of the inner layer; and securing the second rib to the lower panel and the upper panel of the inner layer.

19. The method of claim 18, wherein prior to the laying up the middle layer, forming a plurality of holes through the lower panel of the middle layer, the plurality of holes through the lower panel of the middle layer have polygonal configurations that position edges of the plurality of holes through the lower panel of the middle layer parallel with fibers of the material of the middle layer; and forming a plurality of holes through the upper panel of the middle layer, the plurality of holes through the upper panel of the middle layer have polygonal configurations that position edges of the plurality of holes through the upper panel of the middle layer parallel with fibers of the material of the middle layer.

20. The method of claim 19, wherein the first spar is a rear spar;

the second spar is a front spar; and the lower panel, the intermediate panel, and the upper panel of the outer layer form an outer surface of the aircraft flap.

\* \* \* \* \*